United States Patent [19]

Danielsson

[11] Patent Number: 4,720,056
[45] Date of Patent: Jan. 19, 1988

[54] FLY-FISHING REEL AND PROCESS FOR CHANGING LINES

[76] Inventor: Kurt Danielsson, Lyrvägen 15, S-77700 Smedjebacken, Sweden

[21] Appl. No.: 836,526

[22] Filed: Mar. 5, 1986

[30] Foreign Application Priority Data

Mar. 8, 1985 [SE] Sweden ............................... 8501158

[51] Int. Cl.$^4$ ............................................. A01K 89/02
[52] U.S. Cl. ......................... 242/84.5 R; 242/84.1 R
[58] Field of Search ............ 242/84.1 R, 84.3, 84.5 R, 242/84.5 A, 84.51 A, 84.51 R, 96, 104, 55.18, 129.7, 129.71, 129.72, 68.3

[56] References Cited

U.S. PATENT DOCUMENTS

| | | |
|---|---|---|
| 2,890,004 | 6/1959 | Whitbeck . |
| 2,979,281 | 4/1961 | Shafer . |
| 3,312,417 | 4/1967 | Thompson ..................... 242/84.5 R |
| 3,685,761 | 8/1972 | Zelinski ........................ 242/84.5 R |
| 4,346,857 | 8/1982 | Moll . |
| 4,522,349 | 6/1985 | Clerk ................................. 242/96 |
| 4,544,114 | 10/1985 | Stauffer ........................ 242/84.5 R |

FOREIGN PATENT DOCUMENTS

| | | |
|---|---|---|
| 486076 | 10/1976 | Australia . |
| 8303813 | 9/1984 | France . |
| 69825 | 12/1945 | Norway . |
| 83895 | 6/1954 | Norway . |
| 16233 | 7/1911 | United Kingdom . |

*Primary Examiner*—Billy S. Taylor
*Attorney, Agent, or Firm*—Cushman, Darby & Cushman

[57] ABSTRACT

A fly-fishing reel has a line spool and an associated housing mountable on a fly rod. The line spool includes a tubular body with radially projecting edge flanges, the body being rotatably supported around its inner peripheral surface by carrier rollers rotatably mounted in the housing, the carrier rollers are journalled with a predetermined rotational drag so as to prevent the line spool from spinning. Thus, the inventive fly-fishing reel operates without any specific brake arrangement. The invention further includes a process for shifting a fly line mounted on a fly rod and on a fly fishing reel in which only the original fly line is substituted. Through the help of an auxiliary shaft mounted on the housing of the fly-fishing reel, the original fly line is wound on to an exchange spool leaving the backing line on the line spool of the fly-fishing reel. This backing line is then tied to a new fly line which is wound on another exchange spool which is substituted for the first mentioned exchange spool on the auxiliary shaft. Thereafter, the new fly line is wound onto the fly-fishing reel containing the backing line. This process enables replacing the old fly line with a new fly line without having to string the new fly line through the guides of the fishing pole.

6 Claims, 5 Drawing Figures

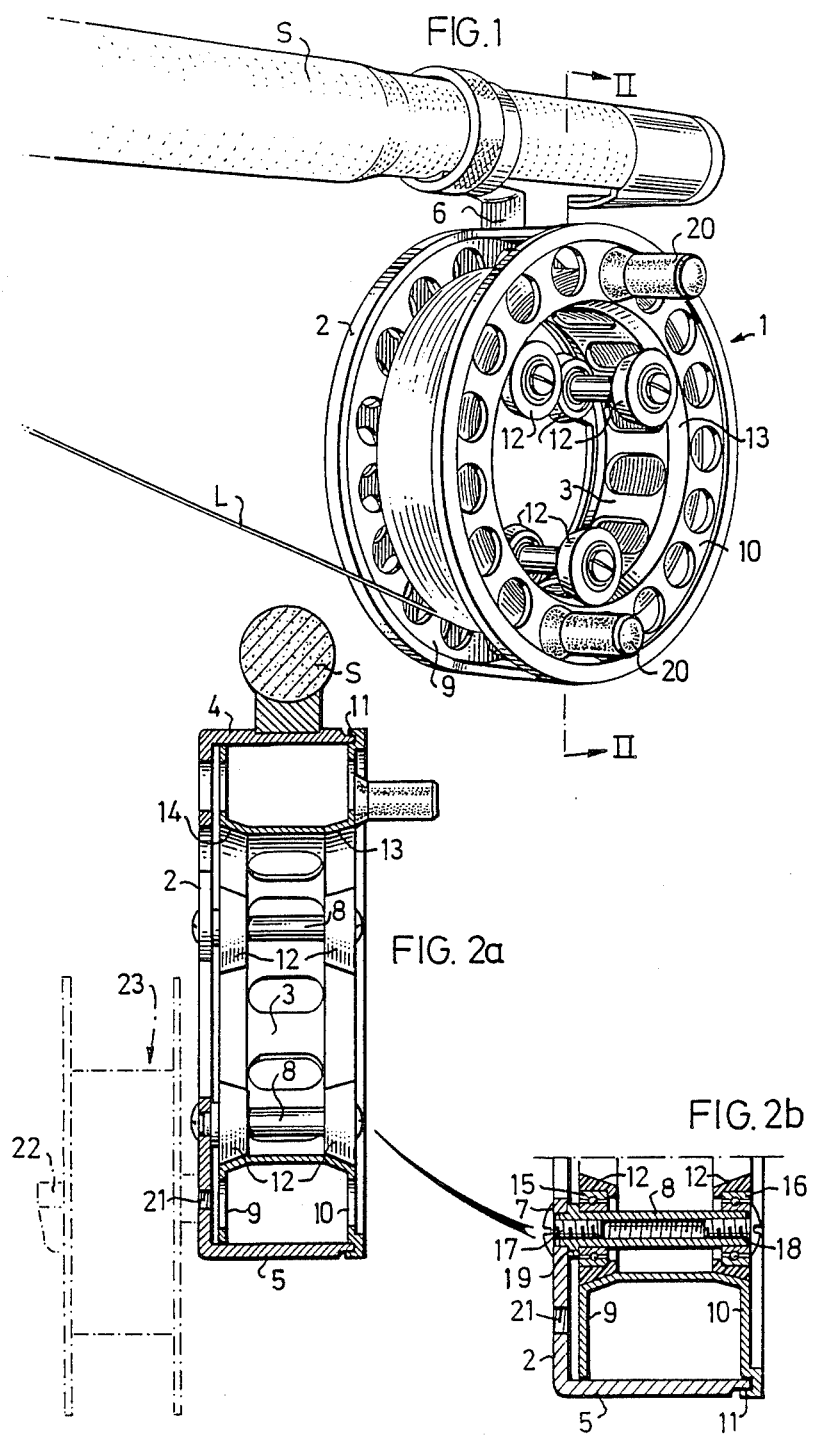

FLY-FISHING REEL AND PROCESS FOR CHANGING LINES

The present invention relates to a fly-fishing reel comprising a line spool and an associated housing mountable on a fly rod, as well as a process for shifting a fly line mounted on a rod and fly-fishing reel.

Fly casting is kind of sport and leisure activity that attracts a continuously increasing interest due to the recreation afforded as a contrast to the stressful life in modern society. The number of practitioners throughout the world is approximately 15 millions.

In fly casting, the fly line constitutes the casting weight and to simplify the matter, the fly line can be said to act like a whip. The line is fed out by swinging the rod back and forth simultaneously as the line is pulled out of the reel by one hand (so-called false casting). The line is finally cast onto the water with a so-called forward cast. A fly line has a length of about 30 m and terminates with a leader onto which is tied the insect-imitating artificial fly. The other end of the fly line is joined to a so-called backing line which is reeled off when a biting fish starts running. Both lines are wound on a mutual fly-fishing reel.

Ever since the origin of fly casting about 400 years ago, the equipment has been substantially improved. Present-day fly rods are almost exclusively made of carbon fiber material, and as a result, modern fly rods have low weight.

Fly lines of today are manufactured without exception from synthetic material demanding only insignificant maintenance. Furthermore they are made tapered, that is they have a profile facilitating their flight through the air. Also, they can be divided in two principal types, floating or sunk lines, depending on whether they should be used for wet-fly or dry-fly fishing. These lines are available in a plurality of weights, and in order to offer diversified angling, a fly caster should therefore have access to numerous different types of line.

Fly-fishing reels are available today in a great number of various types having more or less sophisticated brake systems for running fish. Such reels have in common the difficulty of adjusting to the appropriate drag force. Either the force of inertia will be too great with the risk that the line or the leader is torn off by running fish, or it is too weak causing thereby the reel to spin upon the violent, rapid pulling-out of the line produced by a running fish and which may result in line tangles.

A common factor for conventional fly-fishing reels is also the presence of a center hub and a small spool diameter. The insignificant spool diameter per se involves two drawbacks. Firstly, it may give rise to a certain deformation of the line still remaining when reeling off ("coil-spring effect") due to the small winding radius, resulting many times in so-called snarls on the reeled-off line making the line getting caught in the first guide on the rod and leading to loss of fish.

Secondly, the consequence of such small spool diameter is that the speed of winding the line will be too slow. To eliminate this drawback, certain fly-fishing reels are provided with transmission systems which however makes manufacture more complicated and expensive. One reason for the choice of a small spool diameter is that the demands on balance for modern, lightweight carbon fiber rods will require light reels for obtaining a proper weight distribution of the assembly.

The present invention has for its object to eliminate the afore-said disadvantages and is based on the insight that the primary function of the drag is to prevent the reel from spinning when reeling off the fly line manually, or when the fish is running.

In order to accomplish the primary function mentioned above, a fly-fishing reel according to the invention is distinguished in that the line-carrying spool consists of a tubular body having radially projecting edge flanges and being rotatably supported around its inner peripheral surface by carrier rollers rotatably mounted in the housing, said rollers being journalled with a predetermined rotational resistance so as to prevent the spool from spinning. Thus the spinning drag for the line spool is achieved by journalling the spool in this manner, and no specific brake arrangement will thus be necessary. Since there is no center hub in the spool, it is also possible to select a spool diameter adapted to avoid line deformation.

In a preferred embodiment, the carrier rollers have the shape of truncated cones coacting in pairs with oblique line spool surfaces for fixing the spool both axially and radially.

Moreover, the carrier rollers can be axially displaceably journalled so as to enable the rotational drag to be individually adjusted.

The bearings used for the carrier rollers are preferably ball bearings with rubber sleeve seals which per se produce a rotational drag sufficient for preventing the reel from spinning.

The invention also relates to a process for shifting a fly line mounted on a rod and on a fly-fishing reel. In contrast to conventional processes there is utilized in the inventive process exchange spools without backing line, that is spools having a fly line only. Apart from the profits relating to space savings and lowered acquisition costs for the fly caster, there is also gained the advantage of not having to waste time and effort on running the fly line through the guides in the fly rod, the number of such guide eyelets generally amounting to twelve.

Other features and advantages of the invention will be described in the following with reference to the accompanying drawings, of which FIG. 1 is a perspective view of a fly-fishing reel according to a preferred embodiment of the invention;

FIG. 2a is an axial section of the fly-fishing reel shown in FIG. 1;

FIG. 2b is a partial axial section of the reel of FIG. 1, indicating how a carrier roller is journalled;

Figure 4:
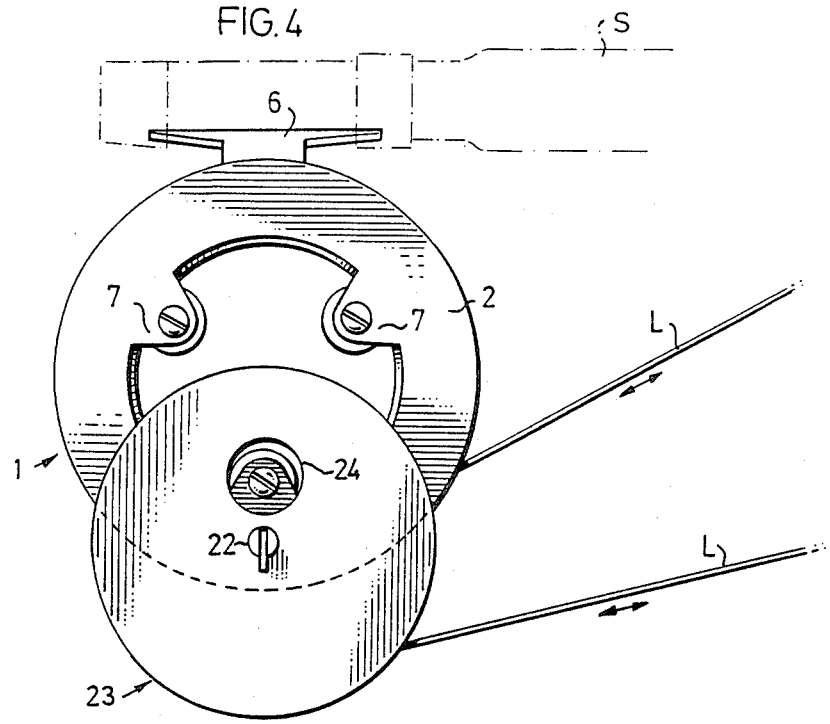
FIG. 4 is a side view of the arrangement shown in FIG. 3.
Figure 3:
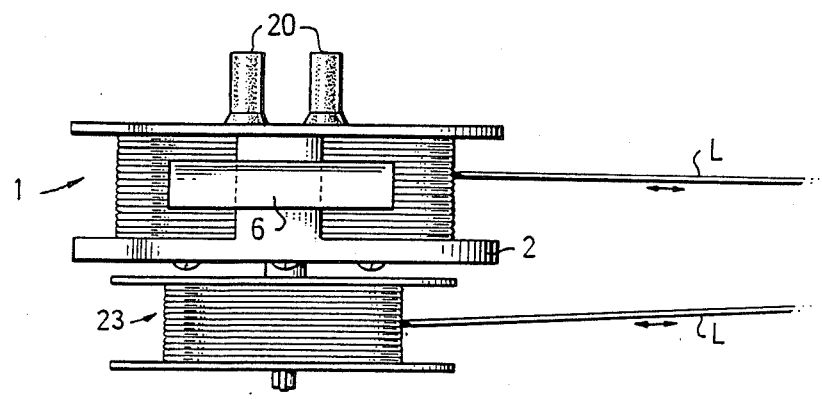
FIG. 3 is a view from above of the fly-fishing reel according to the invention and to which is affixed an exchange spool.

The fly-fishing reel 1 consists of a housing 2 and a line spool 3 supported by the housing. The housing consists substantially of a circular ring plate of light metal such as aluminum for example and which comprises guide plates 4,5 projecting perpendicularly from its outer periphery. In the preferred embodiment there are arranged two such guide plates, although any other number may be selected with due regard to the other dimensions and the weight of the actual reel, and to the rigidity of the line spool associated therewith as well as to the demands on balance for the reel and rod assembly. To the upper guide plate 4 there is attached a conventional quick-coupling member 6 by means of which the reel 1 is affixed to a rod S, as shown in FIG. 1. The housing 2 further comprises attachments 7 radially projecting from the inner periphery of the ring plate and intended for shafts 8. The design of the attachments 7 appears most clearly in FIGS. 2b and 4.

The line spool 3 consists of a tubular body having radially projecting lips or edge flanges 9,10. The edge flange 10, which is located farthest away from the ring plate of the housing 2, has an interior groove 11 into which can be fitted the outer edges of the guide plates of the housing. Two diametrically opposed cranks 20 are affixed to the outside of said flange 10. The ring plate of the housing 2 can have a circular flange projecting inwardly at right angles, and the outer periphery of the most closely situated edge flange 9 is fitted inside said flange.

Around its inner periphery, the line spool is rotatably supported by carrier rollers 12, which have the shape of truncated cones tapering in the direction towards the spool center and being rotatably journalled pairwise on the above-mentioned shafts 8. The oblique peripheral surfaces of the carrier rollers coact with corresponding oblique edge portions 13,14 of the tubular body 3, said body thereby being fixed both radially and axially.

By means of bearings 15,16, the carrier rollers are axially displaceably journalled on the shafts 8 fixed to the attachments 7 in the housing body. The shafts 8 are hollow and have threaded insides. In the proximity of the inner ends of the shafts 8, i.e. the ends disposed at the attachments 7 in the ring plate of the housing, said shafts are provided with projecting annular flanges 19 internally supporting the insides of the attachments 7 when the shafts 8 are fixed to the housing 2 by means of screws 17, as is shown in FIG. 2b. Screws 18 are screwed into the outer ends of the shafts 8 while preventing with their screw heads the outer carrier rollers from outward movements. As illustrated in FIG. 2b, each outside of the carrier rollers acts as a support, on the one hand against the annular flanges 19 and on the other hand against the heads of the screws 18, and each peripheral face of the carrier roller abuts against the corresponding oblique faces of the tubular body, the line spool and the carrier rollers being axially fixed in this manner.

As previously mentioned, the line spool should be journalled so as to prevent it from spinning by means of a built-in rotational drag. This is accomplished in the inventive construction with an appropriate assembly of bearings and material. According to a preferred embodiment, the bearings 15,16 for the carrier rollers are ball bearings with rubber sleeve seals such as those marketed under the tradename SKF ADR WAX62RS, for example. The rubber sleeves per se provide a sufficient degree of drag due to friction for preventing the reel from spinning. However, other types of bearing are also conceivable, as well as ball bearings of steel washer type which may alternatively be mounted with pretension. Furthermore, the number of carrier rollers which is three in the preferred embodiment, can be varied for obtaining the desired rotational drag.

In the preferred embodiment, the carrier rollers are made of hard plastics material, but hard rubber may also be used. Their cone angle should be between 10° and 20°, and preferably 15°.

In FIG. 2b the screw 18 is screwed optimally into the outer end of the shaft 8 thus providing maximum contact pressure against the line spool. By unscrewing the screw 18 slightly, this contact pressure is reduced and thereby also the rotational drag of the line spool.

By making the shaft 8 somewhat shorter than its length as shown in FIG. 2b, the maximum contact pressure for the carrier rollers can be increased as it will then be possible to move the outer carrier roller further to the left in FIG. 2b. With reels set at normal, i.e. when set so that spinning is inhibited during normal handling by the spool being journalled in the inventive manner, the length of the shaft 8 is adapted so as to allow fine adjustment of the axial position of the carrier rollers in order for the rotational drag of the fly-fishing reel to be adjusted to individual requirements.

The dash-dotted lines in FIG. 2a indicate an exchange spool 23 which is rotatable around an auxiliary shaft 22 screwed into a threaded hole 21 in the ring plate of the housing 2. As shown in FIG. 4, the exchange spool has a hole 24 into which a finger can be inserted for rotating the spool.

The exchange spool is used in a process for the exchange of fly lines on the fly-fishing reel. The fly line L to be shifted is affixed to the empty exchange spool 23 and is wound thereon up to the point where the backing line is connected to the fly line by rotating the exchange spool. The line is then cut off at this point. The full exchange spool is removed from the shaft 22 and is replaced by a new exchange spool on which is wound a fly line of the type desired. The backing line is then tied to the new fly line and is wound up on the fly-fishing reel by rotating it, the emptied exchange spool and the auxiliary shaft thereafter being removed.

The procedure described offers two significant advantages over prior art technique. Firstly, the conventional additional fly-fishing reel with fly line as well as backing line can be replaced by a simple and inexpensive exchange spool with fly line only. In this manner the inventive exchange spools will also occupy less space, which allows for the caster to carry a wide selection of fly lines in order to diversify the fishing. Secondly, there is no need to string the fly line through the guides of the rod since this is automatically done when the reeled-off portion of the backing line with the tied-on new fly line is wound up on the fly-fishing reel upon spool exchange. The time thus gained compensates fully for the loss of time caused by having to tie the fly line to the backing line.

There is thus achieved with the present invention a readily constructed fly-fishing reel having a stable and robust design with only a few parts exposed to wear. The carrier rollers, which are the components running the greatest risk of eventual wear, are easily exchangeable. Besides, by screwing in the screw 18 they can be displaced towards the center of the line spool to compensate for possible wear, their life in this manner being further prolonged obtaining thereby an essentially maintenance-free fly-fishing reel.

Moreover, the inventive spool exchange process contributes to delimiting the number of all fishing items necessary for a fly caster to vary his angling.

The preferred embodiment of the fly-fishing reel described above and the exchange spool according to the invention can of course be modified within the scope of the following patent claims. For example, cut-outs can be made in the line spool and the housing to reduce weight, and with the aid of a clamping means or the like, the exchange spool can be affixed to the rod instead of being mounted on the fly-fishing reel. Furthermore, the axial displaceability of the carrier rollers can be accomplished otherwise.

I claim:

1. A fly-fishing reel comprising:
   a line spool including a tubular body with outwardly and radially projecting edge flanges and inclined edge portions on the inner peripheral surface thereof;
   a housing accommodating said spool and having means for attaching said reel to a fly rod, said housing including a ring plate from which a plurality of support shafts, displaced the same radial distance from the center of the ring plate, extend in a perpendicular direction from said ring plate;
   pairs of carrier rollers displaced axially and rotatably journalled on each of said shafts, said rollers having the shape of truncated cones with an inclination corresponding to the inclination of said inclined edge portions of said spool and coacting with said edge portions to rotatable support said spool; and
   means for regulating the contact pressure between said rollers and said inclined edge portions on said spool to a predetermined value, said means being the only means for regulating the rotational drag of said reel.

2. Reel according to claim 1, wherein said regulating means is the head of a screw which is screwed into the free end of said shaft to a degree dependent on the desired contact pressure.

3. Reel according to claim 1, wherein the reel is made of light metal and is provided with cut-outs for reducing its moment of inertia and weight.

4. Reel according to claim 1, wherein the bearings for the carrier rollers constitute ball bearings with rubber sleeve seals for providing rotational drag.

5. Reel according to claim 1, wherein said ring plate is provided with an attachment for an auxiliary shaft on which can be journalled an exchange spool.

6. Process for the exchange of a fly-casting line mounted on a rod and on a fly-fishing reel, said reel provided with an auxiliary shaft removably attached to the housing of said reel, comprising the following steps:
   attaching an empty exchange spool to the auxiliary shaft mounted on the housing of the fly-fishing reel, and affixing the fly line to be replaced to the exchange spool;
   winding off the fly line from the fly-fishing reel by rotating the exchange spool while winding the line completely onto the exchange spool, and then cutting off the backing line at the point of attachment to the fly line;
   replacing the exchange spool from the auxiliary shaft by an additional exchange spool onto which is wound a new fly line of the type desired;
   tying the new fly line to the backing line and winding off and new fly line completely from the additional exchange spool by rotating the fly-fishing reel so as to wind the new fly line onto the fly-fishing reel; and
   removing the emptied additional exchange spool and the auxiliary shaft from the fly-fishing reel.

* * * * *